(No Model.)
J. MULLIGAN.
CAR WHEEL.
No. 436,876. Patented Sept. 23, 1890.
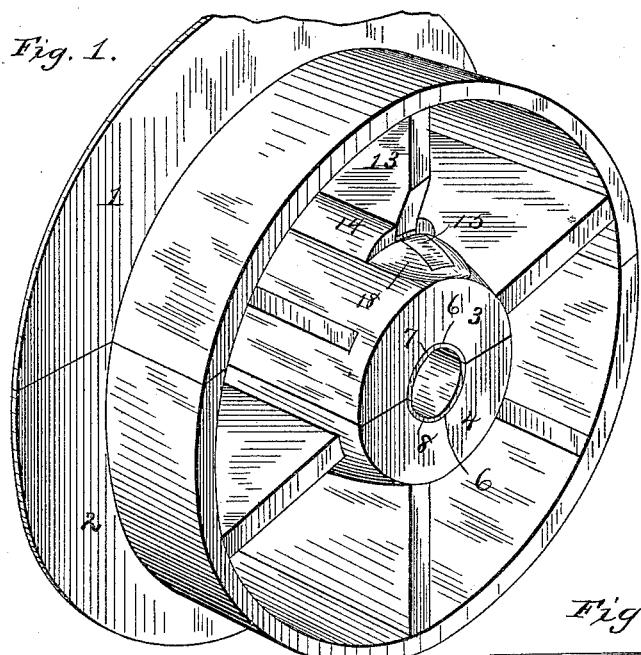
Fig. 1.
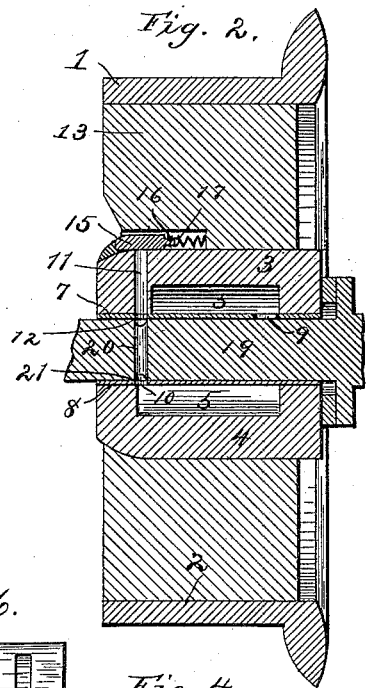
Fig. 2.
Fig. 6.
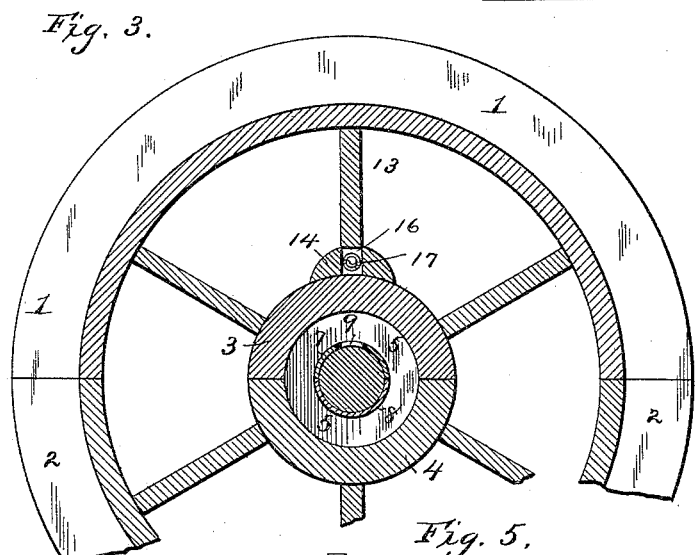
Fig. 3.
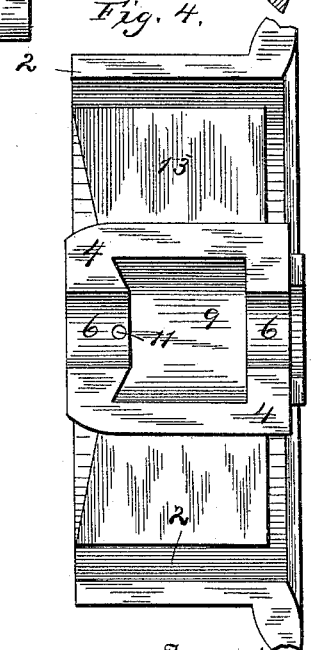
Fig. 4.
Fig. 5.
Witnesses
Harry L. Amer
H. J. Riley
Inventor
John Mulligan
By his Attorneys
C. A. Snow & Co.

UNITED STATES PATENT OFFICE.

JOHN MULLIGAN, OF ROUSE, COLORADO.

CAR-WHEEL.

SPECIFICATION forming part of Letters Patent No. 436,876, dated September 23, 1890.

Application filed February 4, 1890. Serial No. 339,130. (No model.)

*To all whom it may concern:*

Be it known that I, JOHN MULLIGAN, a citizen of the United States, residing at Rouse, in the county of Huerfano and State of Colorado, have invented a new and useful Car-Wheel, of which the following is a specification.

The invention relates to improvements in car-wheels.

The object of the present invention is to provide a car-wheel with an oil-chamber which will surround the spindle of an axle and continually lubricate the same, and which will not materially weaken the wheel, and to which the oil or other lubricant may readily be fed, and from which will be excluded dust and extraneous matter.

The invention consists in the construction and novel combination and arrangement of parts hereinafter fully described, illustrated in the accompanying drawings, and pointed out in the claims hereto appended.

In the drawings, Figure 1 is a perspective view of a wheel constructed in accordance with the invention. Fig. 2 is a transverse sectional view. Fig. 3 is a sectional view taken at right angles to Fig. 2. Fig. 4 is a plan view of one of the sections. Fig. 5 is a detail view of the spindle of the axle. Fig. 6 is a plan view of one of the axle-bearing plates.

Referring to the accompanying drawings, 1 and 2 designate sections of a wheel, which sections are similar and are designed to be suitably secured tegether, and are provided in their hub portions or sections 3 and 4 with semi-cylindrical recesses 5, that register and form an oil-chamber that extends around the spindle of an axle and is designed to be partially filled with an oil or other lubricant. The hub portions or sections 3 and 4 are provided at their side with curved bearing-notches 6, in which are secured curved axle-bearing plates 7 and 8, that receive the spindle and are provided with rectangular openings 9 and 10, that are arranged at opposite ends of the hub and feed the lubricant to the axle-spindle continually after the said lubricant has passed into the oil-chamber, as will hereinafter be fully described.

The section 1 of the wheel is provided with a bore or slot 11, whose inner end registers with a perforation 12 in the axle-bearing plate 7, and the oil is fed into the bore or slot 11 through the perforation 12 of the axle-bearing plate 7 to the axle-spindle 19, which is provided with a transverse opening 20 and an annular groove 21, which are arranged at a point on the spindle opposite the perforation 12 of the axle-bearing plate 7, and the oil enters the groove 21 and the opening 20 and passes through or around the axle to the opposite side thereof and enters the oil-chamber through the rectangular opening 10 of the axle-bearing plate 8. The oil after it enters the oil-chamber is continually fed to the axle through the rectangular openings 9 and 10 of the curved axle-bearing plates 7 and 8, one of said openings being arranged near the outside of the hub, and the other being located near the inner side; and it will readily be seen that it is impossible for the oil to escape from the hub after once entering the oil-chamber. The opening of the slot or bore 11, through which the oil is fed, is arranged at the base of one of the spokes 13 of the wheel, which spoke is recessed and is provided at each side with a strip 14. The strips 14 partially close the recess and form a way for a slide 15, that is provided at its rear end with a projection 16, that engages a spiral spring 17, that normally holds the slide over the mouth of the slot or bore 11, to prevent the entrance of dust and dirt and other extraneous matter, but allows the slide to be readily pushed back to expose the mouth of the slot or bore 11 and allow the point of an oil-can to be inserted. The slide 15 is retained in the recess by a guard-plate 18, which is provided with an opening to permit the insertion of an oil-can, and the guard-plate 18 extends around the front of the recess and effectually prevents the entrance of dust and dirt and other extraneous matter, and is beveled in order not to offer any obstruction. The edge of the slide 15 is also beveled, and its face conforms to the configuration of the outer face of the guard-plate. The section 1 of the wheel having the oil bore or slot is slightly enlarged at one side and around the lower portion of the bore or slot, in order that the strain of the wheel may not be impaired.

It will readily be seen that the construction is simple and economic and adapted to keep the axle continually lubricated, and capable of entirely preventing the entrance of dust and dirt and other extraneous matter.

Having described my invention, what I claim is—

1. In a wheel, the combination of the similar sections provided with semi-cylindrical recesses registering and forming an oil-chamber around the spindle of an axle, one of said sections being provided with a slot or bore 11, and the curved axle-bearing plates provided with openings 9 and 10, one of said openings being arranged near the outer end of the hub, and the other being located near the inner end, substantially as described.

2. In a wheel, the combination of the similar sections provided with semi-cylindrical recesses, registering and forming an oil-chamber around the spindle of an axle, one of said sections being provided with a bore or slot and having its spoke at the opening of the bore or slot recessed, the side strips partially closing the recess, the slide arranged within the recess and adapted to close the opening of the bore or slot, the spring arranged at the back of the slide and holding the latter over the opening of said slot or bore, and the beveled guard-plate arranged at the front of the recess to retain the slide therein and exclude dust and other extraneous matter, substantially as described.

3. In a wheel, the combination of the similar sections provided with the semi-cylindrical recesses forming an oil-chamber, one of said sections being provided with a bore or slot extending from the base of one of the spokes through the hub-section and being arranged to one side of the oil-chamber, and the curved axle-bearing plates provided with openings 9 and 10 arranged near the ends of the hub, one of said plates having a perforation 12 registering with the inner end of the slot or bore, substantially as described.

4. The combination, with an axle provided with an annular groove and a transverse opening, of the two similar sections of the wheel provided with semi-cylindrical recesses forming an oil-chamber, one of said sections being provided with a bore or slot extending from the base of one of the spokes through the hub-section and being arranged at one side of the oil-chamber, and the curved axle-bearing plates provided with openings 9 and 10, one of said plates having a perforation 12 registering with the lower end of the bore or slot, substantially as and for the purpose described.

In testimony that I claim the foregoing as my own I have hereto affixed my signature in presence of two witnesses.

JOHN MULLIGAN.

Witnesses:
W. P. THOMPSON,
C. A. MYERS.